United States Patent [19]
McAlpine

[11] Patent Number: 6,033,149
[45] Date of Patent: Mar. 7, 2000

[54] MATERIAL AND METHOD FOR LINING PIPES

[75] Inventor: George McAlpine, Cary, N.C.

[73] Assignee: Danby of North America, Cary, N.C.

[21] Appl. No.: 09/142,228

[22] PCT Filed: Sep. 11, 1997

[86] PCT No.: PCT/US97/16043

§ 371 Date: Sep. 3, 1998

§ 102(e) Date: Sep. 3, 1998

[87] PCT Pub. No.: WO98/11324

PCT Pub. Date: Mar. 19, 1998

Related U.S. Application Data

[63] Continuation-in-part of application No. 08/712,408, Sep. 11, 1996, Pat. No. 5,785,456.

[51] Int. Cl.[7] .................................................. F16L 1/00
[52] U.S. Cl. .................... 405/154; 405/146; 405/150.1
[58] Field of Search ................................. 405/154, 146, 405/157, 159, 150.1, 155, 156, 152, 153, 138, 132; 138/97

[56] References Cited

U.S. PATENT DOCUMENTS

| | | |
|---|---|---|
| 4,585,371 | 4/1986 | Jones-Hinton. |
| 5,102,263 | 4/1992 | Allen et al.. |
| 5,145,281 | 9/1992 | Molyneux. |
| 5,660,912 | 8/1997 | Menzel ..................................... 405/146 |
| 5,725,328 | 3/1998 | Schmager ............................. 405/150.1 |
| 5,785,456 | 7/1998 | McAlpine ............................... 405/146 |
| 5,928,447 | 7/1999 | GianFrancisco ..................... 405/150.1 |

*Primary Examiner*—Elleen Dunn Lillis
*Assistant Examiner*—Frederick Lagman
*Attorney, Agent, or Firm*—Reed Smith Hazel & Thomas LLP

[57] ABSTRACT

A material and method is provided for lining man-entry sized pipes and securing the lining to the pipe. A plurality of lining panels (10) are positioned along the interior surface of a pipe so as to form a plurality of adjacent wall portions extending through the pipe. The lining panels are each formed with a plurality of T-shaped flanges (20) extending perpendicular to and along said outer wall of the lining panel. A stiffening panel (200) is positioned between at least selected pairs of the T-shaped flanges. The hollow interiors of the stiffening panels are formed to receive and hold grout. The grout when cured provides strength and support for a second layer of grout injected into an annulus between the pipe's inner surface and an outer surface of the lining.

27 Claims, 7 Drawing Sheets

MATERIAL AND METHOD FOR LINING PIPES

This is a continuation-in-part of U.S. patent application Ser. No. 08/712,408, now U.S. Pat. No. 5,785,456, filed Sep. 11, 1996.

BACKGROUND OF THE INVENTION

1. Field of the Invention

The present invention relates generally to a method and material for lining underground pipes such as sewer pipes. More particularly, the present invention relates to a method and material particularly suitable for, but not limited to, man-entry sized circular and oviform pipes.

2. Description of the Prior Art

Sewer pipes often become obstructed or structurally deteriorated due to pipe corrosion by hydrogen sulfide, general degradation, organic growth, and root infiltration. As a result, the flow of sewage can become obstructed or the sewer pipe may collapse. A degraded sewer pipe, even if not obstructed, may allow ground water to infiltrate, thus unnecessarily increasing fluid flow to a treatment plant.

The cost associated with replacing sewer pipes can be prohibitively high, and disruption to above ground traffic may not be feasible. Therefore, sewer pipes are often relined rather than replaced. In order to minimize above ground disruption during sewer pipe relining,, sewer pipes are often relined using technology that does not require digging a trench above the sewer pipe.

Relining sewer pipes can be accomplished by installing a layer of unplasticized/rigid polyvinylchloride (uPVC) to form a new inner surface in existing pipes. An annular gap may be created between the existing pipe's inner surface and the new liner's outer surface. Grout may then be injected into this annular gap to strengthen and support the new liner as discussed in U.S. Pat. Nos. 5,388,929, 5,145,281 and 4,678,370.

When a relining and grouting process is carried out in man-entry sized pipes, for example pipes having diameters of 36" and larger, the plastic liner must resist the hydraulic head pressure of the grout as it is being pumped into the annulus between the pipe and the plastic liner. Additionally, because gravity forces the grout to the bottom of the annulus, the liner may float on top of grout collected at the bottom of the annulus.

In order to prevent deflection of the liner due to hydraulic head pressure and to prevent floating, grout is usually injected in successive stages or "lifts". Individual grout lifts cannot be injected until the previous lift is sufficiently cured to not transmit the hydraulic pressure to that portion of the PVC liner that it is in contact with. Furthermore, the previous grout lift anchors the PVC liner and resists the hydraulic pressure trying to deflect the liner which could result in the liner pulling out of the partially-cured lower grout layer or pulling the liner and grout together away from the pipe wall by overcoming the bond between the grout and pipe wall. Adequate curing may take as much as 12 to 24 hours. This limits the rate at which grout may be injected during the grouting process and increases the total time for the lining process.

Another method to prevent liner deflection due to excessive hydraulic head pressures is to increase the stiffness of the liner. The ability of the plastic liner to withstand hydraulic head pressure without significant deflection is dependent on the flexural rigidity or stiffness factor of the liner's plastic panels. Flexural rigidity is expressed mathematically as the product of the material's flexural modulus of elasticity (E) and its moment of inertia (I).

A material's flexural rigidity may be influenced by the material's geometric form. For example, a common manner of increasing a material's flexural rigidity is to locate a large amount of the material at a distance from a neutral axis, e.g., as in "I" beams.

Liner material is usually manufactured and shipped to a job sight in flat strips or standard size circular coils. The lining material must then be formed to fit the pipe's shape and must be flexible and light enough to be manually deformed. These limitations determine the maximum value of the material's flexural rigidity. For example, a liner measuring 12" wide with ½" high profile, made from rigid PVC has an EI value of 1600. For this material, it is estimated that grout lifts must be limited to about 6 to 12" of vertical rise to avoid excessive panel deflection. The limited size of these lifts significantly increases the grouting process' total time and cost.

Because of the limitations discussed above, a need exists for a method and material which may be used to line man-entry sized pipes allowing faster and more economical lining and grouting by reducing the number of successively cured lifts.

SUMMARY OF THE INVENTION

It is therefore an object of the present invention to provide a method and material for lining relatively large diameter sewer pipes.

It is a further object to provide a method and material for lining relatively large diameter sewer pipes employing grout installed with or without successively cured lifts.

It is yet another object to provide a method and material for lining relatively large diameter sewer pipes employing an inner layer of grout which provides support for an outer layer of grout.

It is yet another object to provide a method and material for lining relatively large diameter sewer pipes employing an inner layer of grout for reducing the susceptibility of a sewer liner from floating on, and being displaced by, a second layer of grout.

It is an even further object to provide a method and material for reinforcing a lining to be used in relatively large diameter sewer pipes.

According to one aspect, the present invention is directed to a structure for lining an interior surface of a pipe. The structure incorporates an elongated lining panel having at least an outer wall, with a plurality of the lining panels being positioned along the interior surface of the pipe so as to form a plurality of adjacent wall portions extending through the pipe. The lining panel further includes a plurality of T-shaped flanges extending perpendicular to and along the outer wall of the lining panel. A means for stiffening the lining panel is positioned between at least selected pairs of the plurality of T-shaped flanges, and includes means for receiving and holding grouting material therein.

In another aspect, the present invention is directed to a structure for reinforcing a stiffness of an elongated panel used for lining an interior surface of a pipe. The structure incorporates a plurality of T-shaped flanges formed at least on an exterior surface of an elongated lining panel and extending longitudinally along the lining panel. The structure itself is composed of an elongated main channel portion having a first elongated hollow space defined therein for receiving and holding grouting material. The elongated main channel portion is fixedly positioned between a selected pair of adjacent T-shaped flanges.

In a further aspect, the present invention is directed to a method for reinforcing a lining panel used for lining an interior surface of a pipe. The method includes the steps of providing an elongated lining panel having at least an outer wall, the lining panel to be positioned along the interior surface of the pipe so as to form a plurality of adjacent wall portions extending through the pipe. The step of providing the elongated lining panel includes forming a plurality of T-shaped flanges extending perpendicular to and along the outer wall of the lining panel and further to extend longitudinally along the lining panel. The method also includes the steps of positioning at least one stiffening panel between a selected pair of the plurality of T-shaped flanges, and feeding grouting material into the at least one stiffening panel.

In an even further aspect, the present invention is directed to a structure for reinforcing a stiffness of an elongated panel used for lining an interior surface of a pipe. The structure incorporates a plurality of T-shaped flanges formed at least on an exterior surface of an elongated lining panel and extending longitudinally along the lining panel, and an elongated main channel body having a plurality of engaging channels defined on an inner wall and extending longitudinally along the main channel body. Each of the plurality of engaging channels is formed to inter-engage with a corresponding T-shaped flange on the elongated lining panel. The main channel body includes an upper channel portion and a plurality of lower channel portions defined by the plurality of engaging channels. The upper channel portion and the lower channel portions are fixedly connected to each other via a plurality of corresponding elongated connecting legs formed therebetween, whereby each of the lower channel portions is fixedly positioned between corresponding pairs of adjacent T-shaped flanges with the upper channel portion positioned above the plurality of T-shaped flanges when inter-engaged with the T-shaped flanges. Each of the plurality of connecting legs has defined therein a connecting channel that communicatively connects a corresponding lower channel portion with the upper channel portion.

Other objects and features of the present invention will be apparent from the following detailed description of the preferred embodiment.

BRIEF DESCRIPTION OF THE DRAWINGS

The invention will be further described in conjunction with the accompanying drawings, in which.

DETAILED DESCRIPTION OF THE PREFERRED EMBODIMENT

Figure 1:
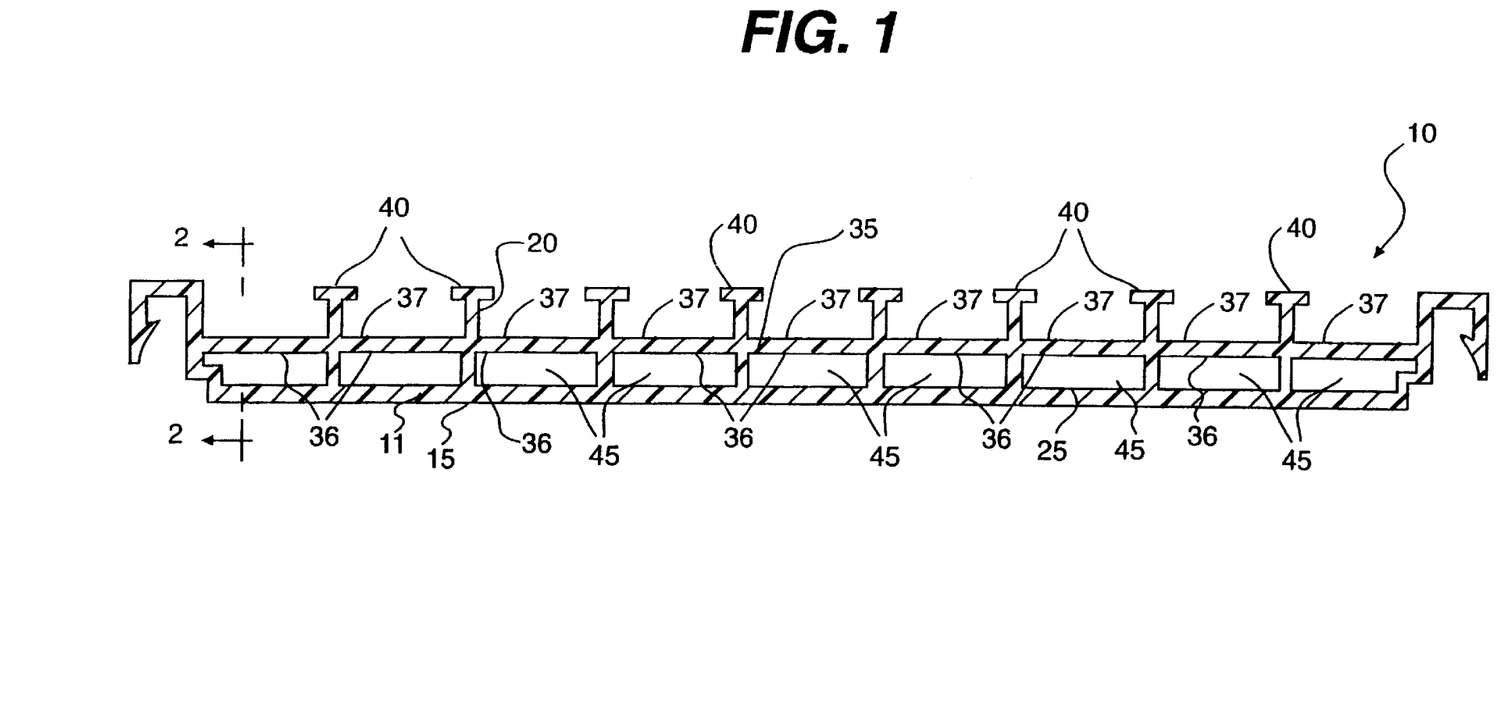
FIG. 1 is a cross sectional view of a liner panel constructed in accordance with a preferred embodiment of the invention.

With reference to the figures, wherein like reference characters indicate like elements throughout the several views and, in particular, with reference to FIG. 1, a panel 10 has an elongated and generally planar body 11, a smooth inner surface 15 and anterior and posterior terminal ends. A plurality of T-shaped legs or flanges 20 extend perpendicularly from an outer surface 25 of body 11. Upon installation as described below, T-shaped flanges 20 stiffen panel 10 by increasing panel 10's flexural rigidity and may also anchor panel 10 to a grout layer (not shown).

Parallel and adjacent to outer surface 25 is a planar wall 35 having an inner wall surface 36 and an outer wall surface 37. Planar wall 35 is integrally formed with outer surfaces of T-shaped flanges 20 and extends the entire width of panel 10. In this fashion, a number of interior channels 45 are bounded by outer surface 25, first and second T-shaped flanges 20 and inner wall surface 36. Interior channels 45 extend the length of panel 10.

Figure 2:
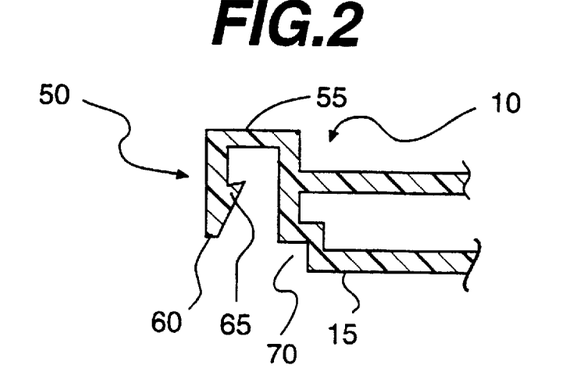
FIG. 2 is a cross sectional view of a locking mechanism taken along lines 2-2' of FIG. 1.

With reference to FIG. 2, opposing edges of panel 10 each include a locking mechanism 50. Locking mechanism 50 includes a retainer 55 having a generally U-shaped cross-section, and a terminal end 60. Terminal end 60 includes a back-swept retaining flange 65 projecting a short distance toward an opposing sidewall of retainer 55. Retainer 55 may be offset from a horizontal plane defined by inner surface 15 of panel 10 creating a notch 70.

Figure 3:
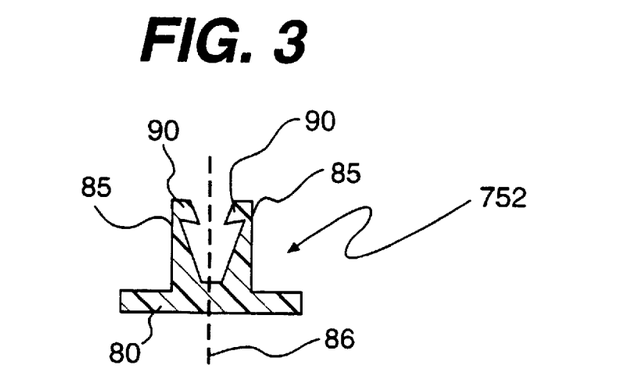
FIG. 3 is a cross sectional view of a clip constructed in accordance with a preferred embodiment of the invention.

Upon installation as discussed below, edges of two adjacent panels 10 may be secured with a joiner strip 75. With reference to FIG. 3, joiner strip 75 is formed into an elongated strip and includes a horizontal member 80 with two vertical members 85 located on opposing sides of a vertical centerline 86 bisecting horizontal member 80. Each vertical member 85 is generally perpendicular to horizontal member 80 and includes a retaining clasp 90 projecting toward vertical centerline 86.

Figure 4:
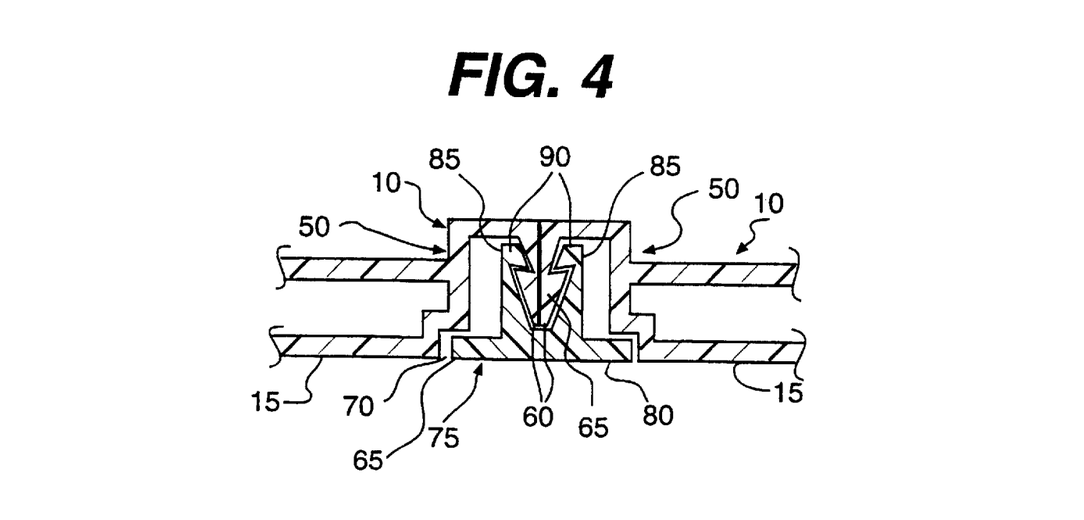
FIG. 4 is a cross sectional view of an assembled locking mechanism constructed in accordance with a preferred embodiment of the invention.

As illustrated in FIG. 4, installation of two panels 10 is performed by positioning two panels 10 adjacent one another and forcing each vertical member 85 of joiner strip 75 over a retaining flange 65 of a locking member 50. In this fashion, retaining clasps 90 and retaining flanges 65 cooperate to lock and secure each panel 10. Additionally, horizontal member 80 of joiner strip 75 fits into notch 70 of inner surface 15 resulting in a smooth and continuous inner surface throughout the length of the pipe liner.

In the preferred construction, panel 10, including body 11, T-shaped flanges 20, wall 35, locking mechanism 50 and joiner strip 75 are manufactured from extruded unplasticized polyvinylchloride (uPVC) or high density polyethylene although any suitably flexible and durable material may also be used.

Preferably, grout has a low viscosity prior to curing and should be able to flow freely through relatively small channels. Grout should also be chemically compatible with the material from which panel 10 is formed. When cured, grout should have an elastic modulus much higher than the material from which panel 10 is formed (greater than 400,000 psi). Grout should preferably be formed from widely available and low cost materials such as Portland cement, fly ash or lime, water and superplasticizer.

Pipes may be lined with a layer of panels 10 in a number of different configurations. For example, extensive pipe degradation may require lining a pipe's entire inner surface. Alternatively, less extensive pipe degradation may require lining only a portion of a pipe's inner surface. These two alternatives are discussed below for illustrative purposes.

To line a pipe's entire inner surface, an elongated length of panel 10 may be passed through a suitable opening in the pipe. Panel 10 may then be curved around the pipe's interior surface in a continuous spiral such that terminal ends 40 of T-shaped legs 20 (FIG. 1) face the pipe's inner surface. Adjacent edges of each panel 10 winding are secured together as described above, resulting in a smooth and continuous lining substantially conforming to the pipe's inner surface. In actual application, an elongated length of panel 10 would normally consist of several 200 foot lengths which are spliced together in the pipe. Such splices must allow the flow of grout to be pumped into the entire lining. Such splices would, therefore, include a plurality of individual couplings shaped as injectors on both ends. (See FIG. 9, 110, and FIG. 6, 96.)

Figure 5:
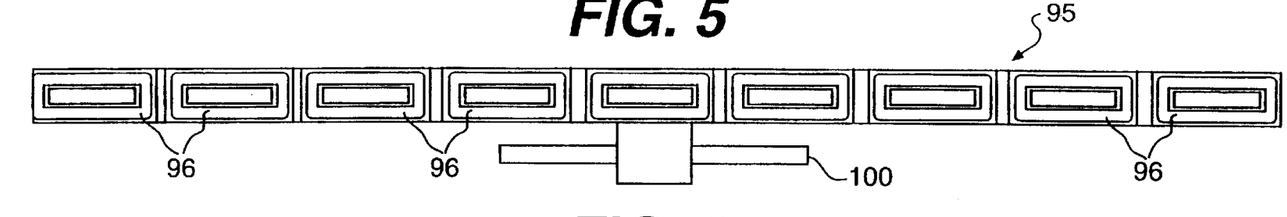
FIG. 5 is a top view of a posterior plug constructed in accordance with a preferred embodiment of the invention.
Figure 6:
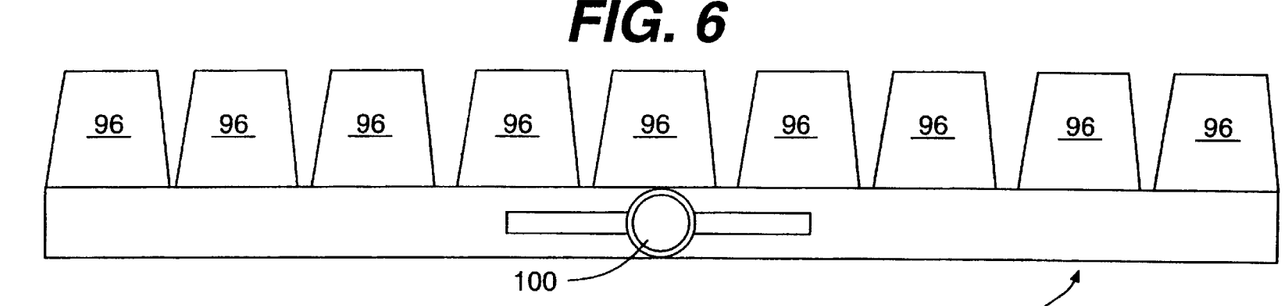
FIG. 6 is a side view of a posterior plug constructed in accordance with a preferred embodiment of the invention.
Figure 7:
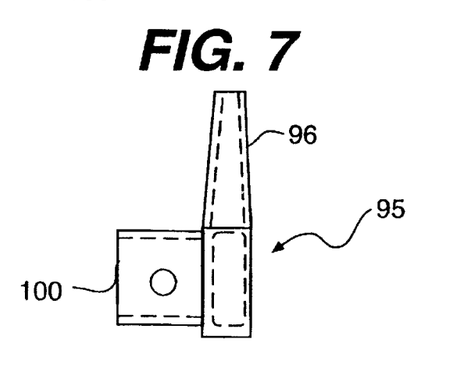
FIG. 7 is an end view of a posterior plug constructed in accordance with a preferred embodiment of the invention.

Following panel 10's installation, exposed ends of interior channel 45 located at a posterior terminal end of panel 10 are closed with a posterior plug 95. With respect to FIGS. 5 through 7, posterior plug 95 includes projections 96 configured complementary to posterior terminal end of panel 10 and seals the corresponding ends of each interior channel 45. Posterior plug 95 also includes an air escape valve 100 for allowing air to exit from each interior channel 45 when grout is injected as described below.

In a preferred embodiment, air escape valve 100 may be an end-cock allowing air to escape from interior channels 45 and which may be manually closed to prevent grout from escaping when interior channels 45 are full of grout and no air bubbles are observed in the grout flow. Alternatively, air escape valve 100 may be a plug or cap configured complementary to posterior terminal end of panel 10. This version of air escape valve 100 is installed after grout completely fills each interior channel 45.

Figure 8:
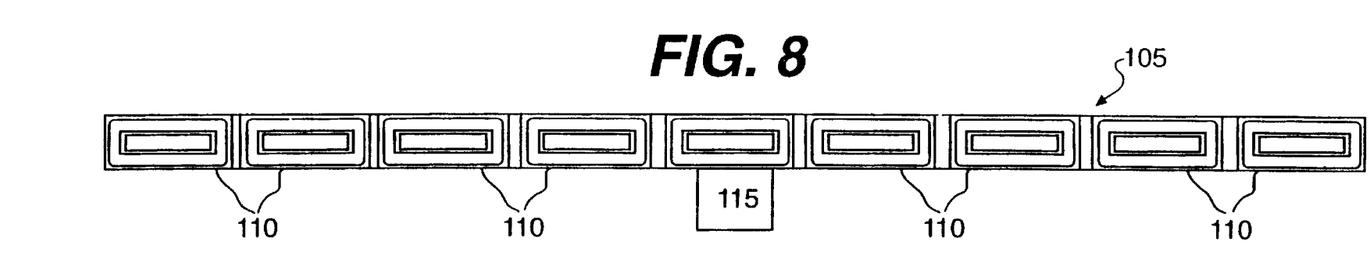
FIG. 8 is a top view of a manifold constructed in accordance with a preferred embodiment of the invention.
Figure 9:
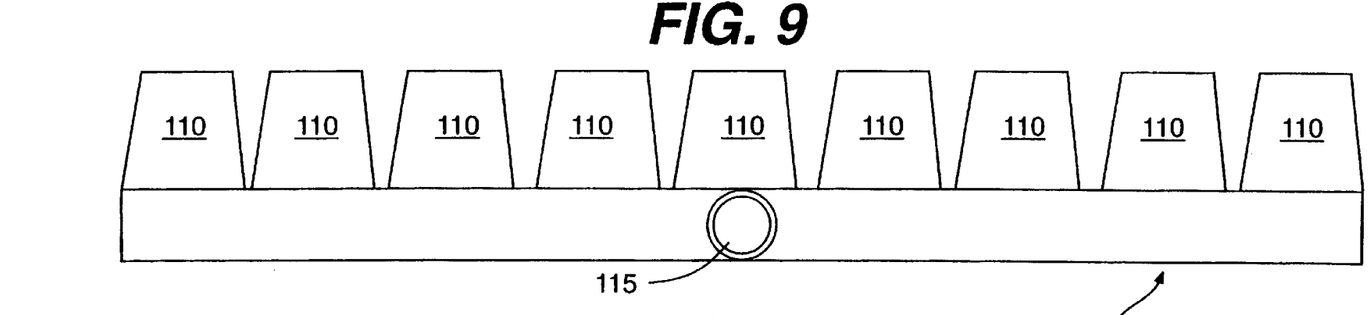
FIG. 9 is a side view of a manifold constructed in accordance with a preferred embodiment of the invention.
Figure 10:
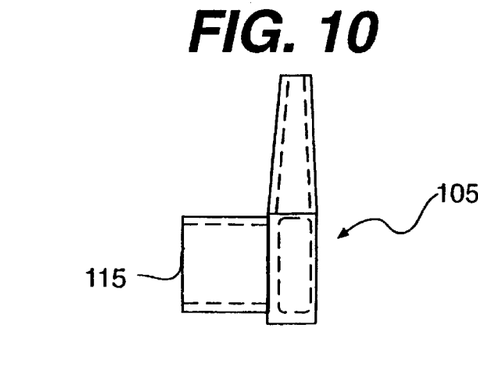
FIG. 10 is an end view of a manifold constructed in accordance with a preferred embodiment of the invention.

Grout is injected into interior channels 45 following the installation of posterior plug 95. Grout is injected into interior channels 45 by means of a manifold 105. As shown in FIGS. 8 through 10, manifold 105 includes injectors 110 configured to fit tightly within an anterior terminal end of panel 10 and which communicate with each interior channel 45. Manifold 105 further includes a receiving tube 115 for coupling with a flexible hose (not shown) through which grout is pumped.

Grout is pumped from an external reservoir, through the flexible hose and through manifold 105 into each interior channel 45 until each interior channel 45 has been completely filled with grout. When each interior channel 45 has been completely filled, manifold 105 is then left in place or is replaced with an anterior plug to prevent grout from leaking out of each interior channel 45. The anterior plug is configured similar to posterior plug 95, except the anterior plug does not have an air escape assembly. The grout is then allowed to cure, i.e. solidify and harden.

In this fashion, the entire pipe is lined with a smooth and continuous uPVC layer having an inner layer of grout. Additionally, an annulus is formed between the pipe's inner surface and wall outer surface 37 of wall 35. An additional layer of grout may then be injected into the annulus between the pipe's inner surface and wall outer surface 37. T-shaped flanges 20 become anchored to this second grout layer and panel 10 is thereby securely positioned. The hydraulic head pressure of this second grout layer is supported by the first grout layer and the first grout layer's weight also increases the allowable vertical rise of first layer of the second grout without "floating" the liner.

In contrast to lining a pipe's entire inner surface as discussed above, it may be desirable to line only portions of the pipe's inner surface. To line a portion of a pipe's inner surface, a number of panel 10 segments are first cut to a predetermined length. Each segment is then curved (circumferential) around the pipe's inner surface such that terminal ends 40 of T-shaped flanges 20 face the pipe's inner surface. The ends of these segments are then secured at the lower extremes of the portion of the pipe to be lined by means of fasteners, i.e., mechanical anchors, nails, J-hooks or any other means of supporting the segments. Adjacent edges of each panel 10 segment are secured together as described above, resulting in a smooth and continuous lining inside the pipe. Depending on the type of fastener used to anchor the panels 10, the necessary steps as would be know to one of skill in the art should be taken to prevent the integrity of the annulus of the panels 10 from being compromised. In other words, sufficient measures should be taken to prevent the panels 10 from being punctured by the fasteners, or if punctured, to seal the annulus of the panels 10, whereby grout does not leak out of the panels 10.

Following installation of the lining, the posterior terminal end of each panel 10 segment is closed with posterior plug 95 as described above. Grout is then injected into each panel 10 segment and cured as described above. Manifold 105 may also be replaced with the anterior plug. In this fashion, a portion of the pipe's inner surface is lined with a smooth and continuous uPVC layer. Again, a gap is formed between the pipe's inner surface and wall outer surface 37.

An additional layer of grout may then be injected between the pipe's inner surface and wall outer surface 37. T-shaped flanges 20 become anchored to this second grout layer and the liner is thereby securely positioned. The hydraulic head pressure of this second grout layer is resisted by the first grout layer.

In this manner, a lining for an inner surface of a pipe is formed having a smooth inner surface, T-shaped flanges 20 extending perpendicularly from outer surface 25 and having a number of interior channels 45. Additionally, a cavity is formed between the inner surface of the pipe and outer wall surface 37.

This liner may have interior channels 45 filled with grout and anterior and posterior terminal ends enclosed by the anterior plug and posterior plug 95 respectively. Additionally, the liner may also have the annulus between the inner surface of the pipe and outer wall surface 37 filled with grout. Finally, the liner may have anterior and posterior terminal ends enclosed by a modification of the anterior plug and posterior plug 95.

In order to reinforce individual panels used to line a pipe, such as the extruded plastic strips disclosed in U.S. Pat. Nos. 4,963,211 or 5,145,281 or the lining panel 10 described above, stiffening panels (as will be described hereinafter) may be inserted between the intermediate flanges of the extruded plastic strips from the '211 or '281 patents, or the T-shaped legs or flanges 20 of the panel 10. Only for purposes of describing the structure and application of the stiffening panels, the following discussion will be based on attaching the stiffening panels to the panel 10 having internal channels 45 as described above. However, the stiffening panel of the present invention may be used and applied to the use of the extruded plastic strips disclosed in U.S. Pat. Nos. 4,963,211 and 5,145,281, wherein no internal channels for grout are built into the strips, or other similar structures in the same manner and with equal effectiveness.

Figure 11:
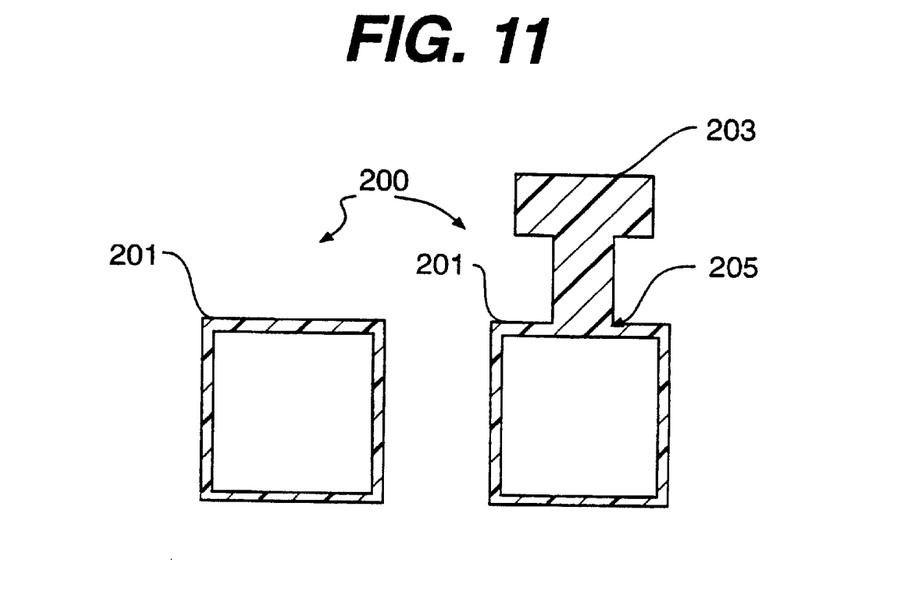
FIG. 11 shows a cross-sectional view of a stiffening panel in accordance with a first embodiment thereof.

As shown in FIG. 11, a first embodiment of a stiffening element 200 according to the present invention incorporates a hollow, main channel portion 201 that is generally square or rectangular in shape so as to match the shape and dimensions of the space defined by the T-shaped flanges 20, the terminal ends 40 and the outer wall surfaces 37 of a panel 10 into which the stiffening element 200 will be inserted. Further, the main channel portion 201 is formed to extend the length of panel 10 or shorter. For additional support/stiffness or for anchoring in surrounding grout, a T-shaped flange 203 may optionally be formed along a top surface 205 of the main channel portion 201 and to extend the length of the main channel portion.

Figure 12:
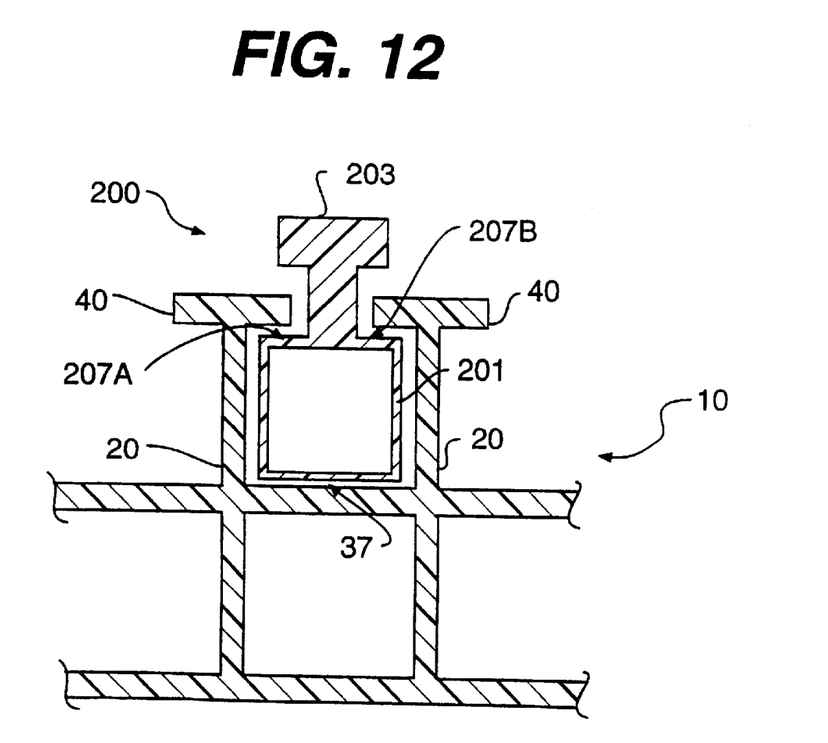
FIG. 12 shows a cross-sectional view of the stiffening panel according to FIG. 11 applied to the liner panel of the present invention shown in a partial cutaway view.

In the application of the stiffening panel 200, as shown in FIG. 12, a plurality of such panels are each inserted (such as by press-fitting or force-fitting) into the spaces defined by the T-shaped flanges 20, the terminal ends 40 and the outer wall surfaces 37 of a panel 10. When properly positioned, the upper corner portions 207a, 207b of the main channel portion 201 are fitted under the terminal ends 40 of the T-shaped flanges 20, whereby the main channel portion 201 of each stiffening panel 200 is fixedly positioned in the panel 10. Grout can be fed into the hollow, main channel portion using conventional techniques or even the manifold 105 illustrated in FIGS. 8–10, before or after each stiffening panel 200 is connected to the panel 10.

Figure 13:
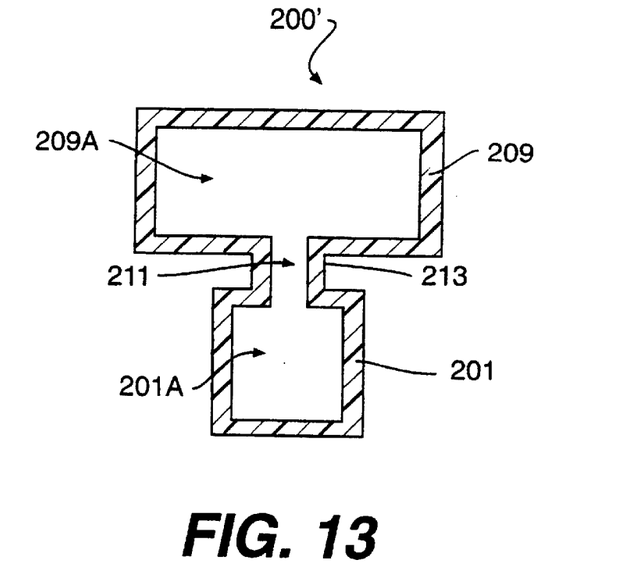
FIG. 13 shows a cross-sectional view of a stiffening panel in accordance with a second embodiment thereof.

In a second embodiment of the invention, as shown in FIG. 13, the stiffening panel 200' also incorporates a hollow, main channel portion 201 that is generally square or rectangular in shape so as to match the shape and dimensions of the space defined by the T-shaped flanges 20, the terminal ends 40 and the outer wall surfaces 37 of a panel 10 into which the stiffening element 200 is inserted. In addition, a hollow, upper channel portion 209 is fixedly positioned above the main channel portion 201. The upper channel portion 209 is also generally square or rectangular in shape. In the embodiment illustrated, the main channel portion 201 is square-shaped, while the upper channel portion 209 is rectangular. However, other combinations as would be known to one of skill in the art would be possible depending on the structure and/or dimensions of the panel 10 and the particular application. The main channel portion 201 and the upper channel portion 209 together are formed to extend the length of panel 10 or shorter. Also in the particular embodiment illustrated, the hollow spaces 201a, 209a defined within the main channel portion 201 and the upper channel portion 209, respectively, are connected via a connecting channel 211 formed in the connecting leg 213. In other variations of this second embodiment, the main channel portion 201 and the upper channel portion 209 may be formed such that their respective hollow spaces are closed and separate from one another with the connecting leg 213 simply being a solid leg element (not shown) fixedly connecting the two portions together.

Figure 14:
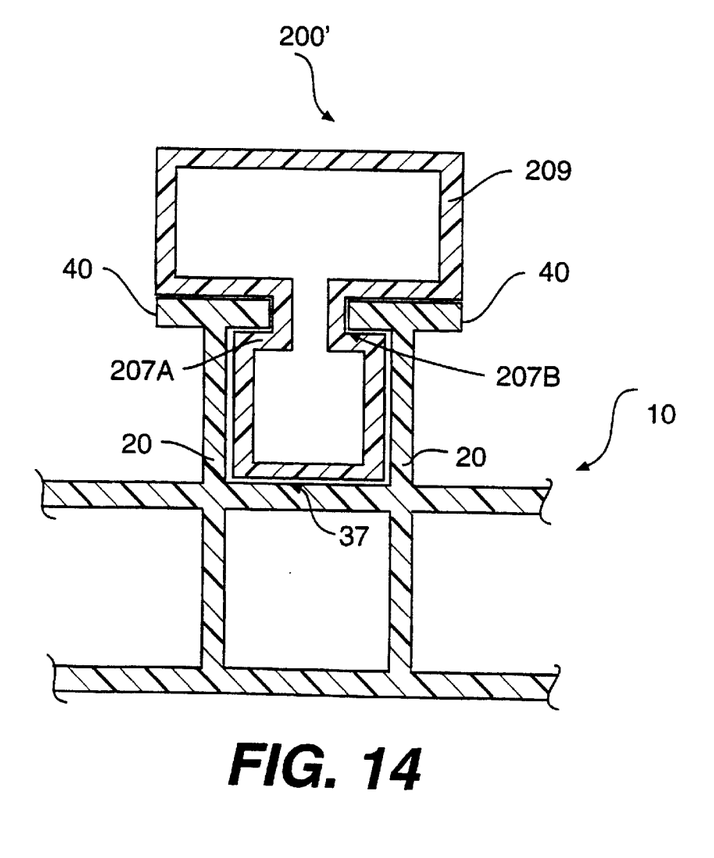
FIG. 14 shows a cross-sectional view of the stiffening panel according to FIG. 13 applied to the liner panel of the present invention shown in a partial cutaway view.

As with the first embodiment, in the application of the stiffening panel 200' according to this second embodiment, a plurality of such panels as shown in FIG. 14 are each inserted (e.g., press-fitting or force-fitting) into the spaces defined by the T-shaped flanges 20, the terminal ends 40 and the outer wall surfaces 37 of a panel 10. When properly positioned, the upper corner portions 207a, 207b of the main channel portion 201 are fitted under the terminal ends 40 of the T-shaped flanges 20, whereby the main channel portion 201 of each stiffening panel 200 is fixedly connected to the panel 10. The upper channel portion 209 is positioned atop the terminal ends 40 of the T-shaped flanges 20. Grout can be fed into the hollow, main channel portion 201, the upper channel portion 209 or both using conventional techniques or the manifold 105 illustrated in FIGS. 8–10, before or after being fitted into a panel 10. When a connecting channel 211 is formed in each stiffening panel 200', filling one of the channel portions would automatically fill the other portion with grout.

Each stiffening panel 200 or 200' may be formed using extruded PVC material or other similar material. To seal off each panel after being filled with grout, end plugs (not shown) that conform to the shape of the ends of the stiffening panels 200 or 200' are used.

When used in connection with the extruded plastic strips disclosed in U.S. Pat. Nos. 4,963,211 and 5,145,281, the hollow, main channel portion 201 is formed generally square or rectangular in shape so as to match the shape and dimensions of the space defined by the T-shaped flanges and base of the extruded plastic strip into which the stiffening element 200 is to be inserted. Further, the main channel portion 201 is formed to extend the length of strip or shorter.

As with the two prior embodiments described above, for additional support/stiffness or for anchoring in surrounding grout, a T-shaped flange 203 may optionally be formed along a top surface 205 of the main channel portion 201 and to extend the length of the main channel portion. Alternatively, a hollow, upper channel portion 209 may be fixedly positioned above the main channel portion 201. The hollow spaces 201a, 209a defined within the main channel portion 201 and the upper channel portion 209, respectively, may be connected via a connecting channel 211 formed in the connecting leg 213, or the main channel portion 201 and the upper channel portion 209 may be formed such that their respective hollow spaces are closed and separate from one another with the connecting leg 213 simply being a solid leg element fixedly connecting the two portions together.

In the application of the stiffening panel 200 or 200', a plurality of such panels are each inserted (such as by press-fitting or Lorce-fitting) into the spaces defined by the T-shaped flanges 20 and the base of the extruded plastic strip. When properly positioned, the upper corner portions 207a, 207b of the main channel portion 201 are fitted under the T-shaped flanges 20, whereby the main channel portion 201 of each stiffening panel is fixedly positioned in the extruded plastic strip.

In an example operation applying the stiffening panel 200 or 200' to an extruded plastic strip or a panel 10, the number and location of stiffening panels used in a strip or panel may vary depending on the requirements of the particular application. For example, as few as two stiffening panels applied to a strip or panel have been found to increase stiffness by a factor of 10, while using three stiffening panels has been found to increase stiffness an additional 50%. The stiffening panel 200 or 200' may be positioned in every other space between the T-shaped flanges 20, depending on the number of spaces defined on a strip or panel.

With the desired number of stiffening panels attached to the strip or panel, grout is pumped/poured/fed into the stiffening panels, and the stiffening panels are subsequently sealed with end plugs. The strip or panel is then immediately positioned in the pipe to be lined and formed into the shape or curvature desired for the application, allowing the grout to harden into position.

Alternatively, if the application warrants stringent positional, dimensional or shape requirements, the strip or panel with the stiffening panels 200 attached can first be formed or anchored into the desired shape or curvature and then fed with the grout. After the grout hardens, the stiffened strip or panel can be transported into the desired position and installed as a lining in the pipe.

Figure 15:
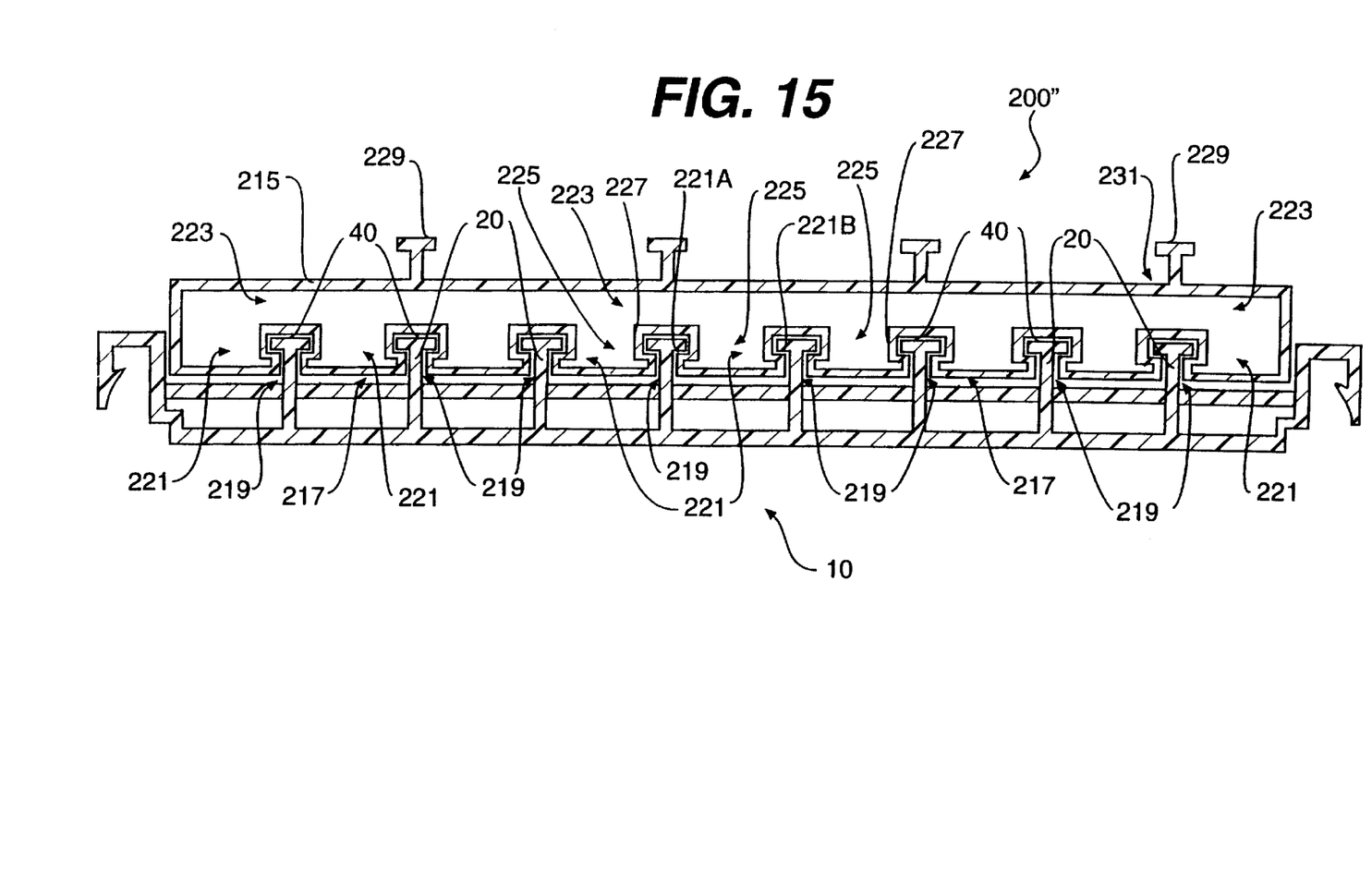
FIG. 15 shows a cross-sectional view of a stiffening panel in accordance with a third embodiment thereof and as applied to the liner panel of the present invention.

In a further embodiment of the invention, a stiffening panel 200" as shown in FIG. 15 is composed of a single main channel body 215 that is formed to both extend the width of a panel 10 and extend the length of the panel 10 or shorter. Along an inner wall 217 of the main channel body 215, a plurality of channels 219 extending the length of the stiffening panel 200" are defined to conform and inter-engage with the plurality of T-shaped flanges 20 of the panel 10. In particular, when the stiffening panel 200" is inserted (e.g., press-fitting or force-fitting) into the spaces defined by the T-shaped flanges 20, upper corner portions 221a, 221b of the inner channel portions 221 are fitted under the terminal ends 40 of the T-shaped flanges 20, whereby the inner channel portions 221 of the main channel body 215 is fixedly connected to the strip or panel. The outer channel portion 223 is positioned atop the terminal ends 40 of the T-shaped flanges 20. The inner channel portions 221 and the outer channel portion 223 defined in the main channel body 215 are connected via connecting channels 225 formed in the connecting legs 227.

Grout can be fed into the hollow, main channel body 215. To seal off each panel 200" after being filled with grout, end plugs (not shown) that conform to the shape of the ends of the stiffening panels 200" are used. For additional support/stiffness and for anchoring in surrounding grout, a plurality of T-shaped flanges 229 is formed along an outer surface 231 of the outer channel portion 223 and to extend the length of the main channel body 215.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A structure for lining an interior surface of a pipe, comprising:

an elongated lining panel having at least an outer wall, a plurality of said lining panels being positioned along the interior surface of said pipe so as to form a plurality of adjacent wall portions extending through said pipe, said lining panel further including a plurality of T-shaped flanges extending perpendicular to and along said outer wall of said lining panel; and means for stiffening said lining panel, said stiffening means being positioned between at least selected pairs of said plurality of T-shaped flanges, and further said stiffening means having means for receiving and holding grout therein.

2. A structure for lining an interior surface of a pipe as claimed in claim 1, characterized in that said stiffening means includes at least one elongated stiffening panel having a main channel portion extending longitudinally along said lining panel, said elongated stiffening panel being fixedly positioned between a selected pair of adjacent T-shaped flanges, and said means for receiving and holding grout includes said main channel portion being formed with a first elongated hollow space defined therein.

3. A structure for lining an interior surface of a pipe as claimed in claim 2, characterized in that said elongated stiffening panel further includes an anterior end and a posterior end defined on opposite longitudinal portions of said stiffening panel, said structure further comprising:

means for plugging at least one of said anterior and posterior ends of said stiffening panel so as to sealably close said first elongated hollow space.

4. A structure for lining an interior surface of a pipe as claimed in claim 2, characterized in that said elongated stiffening panel further includes an upper channel portion fixedly connected to an upper wall surface of said main channel portion via an elongated connecting leg and extending longitudinally along said lining panel, whereby said main channel portion is fixedly positioned between the selected pair of adjacent T-shaped flanges with the upper channel portion positioned above said selected pair of adjacent T-shaped flanges, and said means for receiving and holding grout further includes said upper channel portion being formed with a second elongated hollow space defined therein.

5. A structure for lining an interior surface of a pipe as claimed in claim 4, characterized in that said elongated stiffening panel further includes an anterior end and a posterior end defined on opposite longitudinal portions of said stiffening panel, said structure further comprising:

means for plugging at least one of said anterior and posterior ends of said stiffening panel so as to sealably close said first and second elongated hollow spaces.

6. A structure for lining an interior surface of a pipe as claimed in claim 4, characterized in that said connecting leg has defined therein a connecting channel that communicatively connects said first and second elongated hollow spaces together and that extends longitudinally along said stiffening panel.

7. A structure for lining an interior surface of a pipe as claimed in claim 2, characterized in that said stiffening panel is formed from at least one of unplasticized polyvinylchloride and high density polyethylene.

8. A structure for lining an interior surface of a pipe as claimed in claim 2, characterized in that said stiffening panel further includes a T-shaped flange fixedly positioned on an upper wall surface of said main channel portion and extending longitudinally along said lining panel.

9. A structure for reinforcing a stiffness of an elongated panel used for lining an interior surface of a pipe, said structure comprising:

a plurality of T-shaped flanges formed at least on an exterior surface of an elongated lining panel and extending longitudinally along said lining panel; and an elongated main channel portion having a first elongated hollow space defined therein for receiving and holding grout, said elongated main channel portion being fixedly positioned between a selected pair of adjacent T-shaped flanges.

10. A structure as claimed in claim 9, characterized in that said elongated main channel portion further includes an anterior end and a posterior end defined on opposite longitudinal portions thereof, said structure further comprising:

means for plugging at least one of said anterior and posterior ends of said elongated main channel portion so as to sealably close said first elongated hollow space.

11. A structure as claimed in claim 9, further comprising:

an upper channel portion fixedly connected to an upper wall surface of said main channel portion via an elongated connecting leg and extending longitudinally along said lining panel, whereby said main channel portion is fixedly positioned between the selected pair of adjacent T-shaped flanges with the upper channel portion positioned above said selected pair of adjacent T-shaped flanges, said upper channel portion being formed with a second elongated hollow space defined therein.

12. A structure as claimed in claim 11, characterized in that said connecting leg has defined therein a connecting channel that communicatively connects said first and second elongated hollow spaces together and that extends longitudinally along between said main channel portion and said upper channel portion.

13. A structure as claimed in claim 9, characterized in that said elongated main channel portion and upper channel portion further include anterior ends and posterior ends defined on opposite longitudinal portions thereof, respectively, said structure further comprising:

means for plugging at least one of said anterior and posterior ends of said main and upper channel portions so as to sealably close said first and second elongated hollow spaces.

14. A structure as claimed in claim 9, characterized in that said structure is formed from at least one of unplasticized polyvinylchloride and high density polyethylene.

15. A structure as claimed in claim 9, characterized in that said main channel portion further includes a T-shaped flange fixedly positioned on an upper wall surface thereof and extending longitudinally along said main channel portion.

16. A method for reinforcing a lining panel used for lining an interior surface of a pipe, comprising the steps of:

providing an elongated lining panel having at least an outer wall, said lining panel to be positioned along the interior surface of said pipe so as to form a plurality of adjacent wall portions extending through said pipe, said step of providing said elongated lining panel including the step of forming a plurality of T-shaped flanges extending perpendicular to and along said outer wall of said lining panel and further to extend longitudinally along said lining panel;

positioning at least one stiffening panel between a selected pair of said plurality of T-shaped flanges; and feeding grout into said at least one stiffening panel.

17. A method for reinforcing a lining panel used for lining an interior surface of a pipe as claimed in claim 16, characterized in that said step of positioning at least one stiffening panel includes forming said at least one elongated stiffening panel with a main channel portion extending longitudinally along said lining panel, said elongated stiffening panel being fixedly positioned between a selected pair of adjacent T-shaped flanges, and feeding grout into a first elongated hollow space defined in said main channel portion.

18. A method for reinforcing a lining panel used for lining an interior surface of a pipe as claimed in claim 17, characterized in that said elongated stiffening panel further includes an anterior end and a posterior end defined on opposite longitudinal portions of said stiffening panel, said method further comprising the steps of:

plugging at least one of said anterior and posterior ends of said stiffening panel so as to sealably close said first elongated hollow space.

19. A method for reinforcing a lining panel used for lining an interior surface of a pipe as claimed in claim 17, characterized in that said step of positioning at least one stiffening panel includes forming said at least one elongated stiffening panel with an upper channel portion fixedly connected to an upper wall surface of said main channel portion via an elongated connecting leg and extending longitudinally along said lining panel, whereby said step of positioning said at least one stiffening panel includes positioning said main channel portion between the selected pair of adjacent T-shaped flanges with the upper channel portion positioned above said selected pair of adjacent T-shaped flanges, and said step of feeding grout further includes feeding said grout into a second elongated hollow space defined in said upper channel portion.

20. A method for reinforcing a lining panel used for lining an interior surface of a pipe as claimed in claim 19, characterized in that said elongated stiffening panel further includes an anterior end and a posterior end defined on opposite longitudinal portions of said stiffening panel, said method further comprising the step of:

plugging at least one of said anterior and posterior ends of said stiffening panel so as to sealably close said first and second elongated hollow spaces.

21. A method for reinforcing a lining panel used for lining an interior surface of a pipe as claimed in claim 19, characterized in that said connecting leg has defined therein a connecting channel that communicatively connects said first and second elongated hollow spaces together and that extends longitudinally along said stiffening panel.

22. A method for reinforcing a lining panel used for lining an interior surface of a pipe as claimed in claim 17, characterized in that said step of positioning said at least one stiffening panel include forming said at least one stiffening panel with a T-shaped leg fixedly positioned on an upper wall surface of said main channel portion and extending longitudinally along said lining panel.

23. A method for reinforcing a lining panel used for lining an interior surface of a pipe as claimed in claim 16, further comprising the step of:

forming said stiffening panel from at least one of unplasticized polyvinylchloride and high density polyethylene.

24. A structure for reinforcing a stiffness of an elongated panel used for lining an interior surface of a pipe, said structure comprising:

a plurality of T-shaped flanges formed at least on an exterior surface of an elongated lining panel and extending longitudinally along said lining panel; and an elongated main channel body having a plurality of engaging channels defined on an inner wall and extending longitudinally along said main channel body, each of said plurality of engaging channels being formed to inter-engage with a corresponding T-shaped flange on said elongated lining panel, characterized in that said main channel body includes an upper channel portion and a plurality of lower channel portions defined by said plurality of engaging channels, said upper channel portion and said lower channel portions being fixedly connected to each other via a plurality of corresponding elongated connecting legs formed therebetween, whereby each of said lower channel portions is fixedly positioned between corresponding pairs of adjacent T-shaped flanges with the upper channel portion positioned above said plurality of T-shaped flanges when inter-engaged with said T-shaped flanges, and each of said plurality of connecting legs has defined therein a connecting channel that communicatively connects a corresponding lower channel portion with said upper channel portion.

25. A structure as claimed in claim 24, characterized in that said elongated main channel body further includes an anterior end and posterior end defined on opposite longitudinal portions thereof, respectively, said structure further comprising:

means for plugging at least one of said anterior and posterior ends of said main channel body so as to sealably close said upper and lower channel portions.

26. A structure as claimed in claim 24, characterized in that said structure is formed from at least one of unplasticized polyvinylchloride and high density polyethylene.

27. A structure as claimed in claim 24, characterized in that said main channel body further includes a plurality of T-shaped flanges fixedly positioned on an upper wall surface thereof and extending longitudinally along said main channel body.

* * * * *